United States Patent
Karppanen et al.

(10) Patent No.: US 11,165,785 B1
(45) Date of Patent: Nov. 2, 2021

(54) VALIDATION OF USER SUBGROUPS AGAINST DIRECTORY ATTRIBUTES FOR DYNAMIC GROUP RULES

(71) Applicant: MICROSOFT TECHNOLOGY LICENSING, LLC, Redmond, WA (US)

(72) Inventors: Yuan Karppanen, Bellevue, WA (US); Roland A. Borges, San Francisco, CA (US); Somesh Chandra, Redmond, WA (US); Zoltan Pekic, Seattle, WA (US); Yi Dong, Redmond, WA (US); Kristina K. Hotz, Seattle, WA (US); Aakansha Nagwani, Bellevue, WA (US); Venkata Rami Reddy Dulam, Bellevue, WA (US); Kristina Bain Smith, Redmond, WA (US); Yarsovardhan Reddy Eswarawaka, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/986,218

(22) Filed: Aug. 5, 2020

(51) Int. Cl.
*H04L 29/06* (2006.01)
*G06F 21/60* (2013.01)

(52) U.S. Cl.
CPC .......... *H04L 63/102* (2013.01); *G06F 21/604* (2013.01); *H04L 63/08* (2013.01); *H04L 63/20* (2013.01); *G06F 2221/2141* (2013.01)

(58) Field of Classification Search
CPC ....... H04L 63/08; H04L 63/20; H04L 63/102; G06F 21/604; G06F 2221/2141
See application file for complete search history.

(56) References Cited

U.S. PATENT DOCUMENTS

2003/0084069 A1* 5/2003 Boreham .............. H04L 63/102
2011/0040793 A1* 2/2011 Davidson ............... G06F 16/21
707/784

(Continued)

OTHER PUBLICATIONS

Microsoft Docs. "Create attribute-based rules for dyamic group membership in Azure Active Directory", https://docs.rnicrosoft.comien-US/azure/activ&directory/active-directory-groups-dynamic-membership-azure-portai. pp. 1-34. (Year: 2018).*

(Continued)

*Primary Examiner* — John M MacIlwinen
(74) *Attorney, Agent, or Firm* — Newport IP, LLC; Jacob P. Rohwer

(57) ABSTRACT

Selective validation of subgroups of users against group rule parameters is performed to validate group rule parameters for a dynamic group rule. An administrator defines the group rule parameters and selects individual user accounts which are either expected to be included within and/or excluded from a full membership list for the dynamic group rule. For example, the administrator may select first user accounts that are expected to be included within the full membership list and/or second user accounts that are expected to be excluded from the full membership list. Then, a subgroup validation report is generated to inform the administrator whether or not individual user accounts from the subgroup of user accounts satisfy the group rule parameters and, therefore, will be included within the full membership list of the dynamic group rule. The subgroup validation report reveals the efficacy of the group rule parameters.

20 Claims, 10 Drawing Sheets

(56) References Cited

U.S. PATENT DOCUMENTS

2011/0173591 A1* 7/2011 Prasad ............... G06F 8/30
717/126
2016/0019250 A1* 1/2016 Kumar ............ G06F 16/2291
707/740

OTHER PUBLICATIONS

Mayank, M. and Garg, M. "Developing Applications with Azure Active Directory", apress. Hyderabad, India, pp. 1-284. (Year: 2019).*

Sinha, et al., "Administrator role permissions in Azure Active Directory", Retrieved from: https://docs.microsoft.com/en-US/azure/active-directory/users-groups-roles/directory-assign-admin-roles#directory-writers, Jun. 15, 2020, 102 Pages.

* cited by examiner

VALIDATION OF USER SUBGROUPS AGAINST DIRECTORY ATTRIBUTES FOR DYNAMIC GROUP RULES

BACKGROUND

Modern organizations often have complex organizational structures that include vast numbers of users having widely varying directory attributes. For example, an organization may include tens or even hundreds of thousands of users that are spread across numerous different departments within an organizational hierarchy, assigned different formal job titles, located within different cities, and so on. It is often desirable to construct dynamic group rules that define membership within a group of interest based on values for certain directory attributes. One benefit of utilizing dynamic group rules is that a particular group of interest may include hundreds or even thousands of users and initially populating such a large group by manually identifying and adding users would clearly be laborious and likely even error prone. Another benefit of utilizing dynamic group rules is that group membership can be determined automatically on a continuously rolling basis to reduce the administrative overhead of manually adding and removing users as they join and/or leave departments or as other relevant directory attributes change.

Membership processing typically begins once a group rule administrator has defined and saved group rule parameters in association with a newly created a dynamic group rule. Such membership processing includes exhaustively parsing the entire directory to identify which users have directory attributes that satisfy the group rule parameters for the dynamic group rule. Exhaustive parsing includes analyzing directory attributes for each user within an organization on an individual (one-by-one) basis. When performed for organizations comprised of large numbers of employees, this exhaustive parsing is time consuming and requires significant computing resources (e.g., processing cycles are spent for each user in a user directory). In the event that an error is made when defining the group rule parameters for the dynamic group rule, the error is likely to be discovered only when some user whom was inadvertently included in (or left out of) the group of interest raises the issue by informing the group rule administrator. Then, the group rule administrator typically will refine the group rule parameters to address the error and then re-initiate the membership processing—which again includes exhaustively parsing an organization's entire user directory. Unfortunately, this typical process is inefficient since errors are only revealed once a dynamic group rule is actually deployed after full membership processing has occurred. Not only is this process disruptive to users who are affected by errors, but additionally this process results in a highly inefficient use of processing resources since full membership processing occurs multiple times while group rule parameters for a new a dynamic group rule are refined.

It is with respect to these considerations and others that the disclosure made herein is presented.

SUMMARY

Technologies described herein facilitate selective validation of administrator-defined subgroups of users against group rule parameters that are usable to identify a full membership list corresponding to a dynamic group rule. Generally described, an administrator may define group rule parameters for a dynamic group rule and also select individual user accounts which are either expected to be included within and/or excluded from the full membership list for the dynamic group rule. For example, while setting up a new dynamic group rule that is intended to include, but also be limited to, all members of an engineering group, an administrator may define both the group rule parameters for identifying the full membership list and a subgroup of user accounts to perform a selective validation against to ensure the group rule parameters are operating as intended. In defining the subgroup of user accounts, the administrator may select one or more first user accounts that are expected to be included within the full membership list (e.g., user accounts for specific persons that are known to be within the engineering group). Additionally, or alternatively, the administrator may select one or more second user accounts that are expected to be excluded from the full membership list (e.g., user accounts for specific persons that are known to not be members of the engineering group). Then, a subgroup validation report is generated to inform the administrator whether or not individual user accounts from the subgroup of user accounts satisfy the group rule parameters and, therefore, will be included within the full membership list of the dynamic group rule.

Due to the act of setting up dynamic group rules being a manual process that is subject to human error, the subgroup validation report provides valuable insight into the efficacy of the group rule parameters. For example, the subgroup validation report may expressly indicate whether those first user accounts that are included within the administrator-defined subgroup and are expected to be included within the full membership list actually do satisfy the group rule parameters as intended. Additionally, or alternatively, the subgroup validation report may expressly indicate whether those second user accounts that are included within the administrator-defined subgroup and are expected to be excluded from the full membership list actually do fail to satisfy the group rule parameters as intended. Under circumstances in which the subgroup validation report indicates that the group rule parameters are including and/or excluding user accounts from the full membership list as intended, then the administrator may interpret the subgroup validation report as confirmation as to the efficacy of the group rule parameters. In contrast, if the subgroup validation report indicates that the group rule parameters are not including and/or excluding user accounts as intended, then the administrator may further analyze the situation to diagnose and mitigate the issue. For example, the administrator may identify a syntax error in the group rule parameter and revise the group rule parameters accordingly.

In an exemplary embodiment, a dynamic group generating service exposes a group rule management portal to enable an administrator to generate and/or refine group rule parameters for a dynamic group rule. The dynamic group generation service may obtain directory data for various users within an organizational structure. The directory data may define specific values for various user attributes such as, for example, a "Department" user attribute, a "Location" user attribute, etc. As the directory data changes to reflect the current attributes of the various users within the organizational structure, the dynamic group generation service may continually monitor the directory data and update the full membership lists for currently active dynamic group rules. In this way, once the group rule parameters are properly defined, the administrative overhead of having to manually identify directory changes and update full membership lists is mitigated. However, for a variety of reasons it may be desirable to validate the efficacy of the group rule parameters for a particular dynamic group rule. For example, an administrator may wish to confirm that the rule syntax she has written for a new dynamic group rule will achieve the desired result prior to fully deploying the dynamic group rule. To illustrate this point, consider a situation in which a "Welcome Email" is to be sent to members of a newly defined dynamic group rule. Here, if there is an error in the rule syntax that results in user's being inadvertently included within a newly defined dynamic group, deploying (e.g., activating) the erroneous rule syntax will result in "Welcome Emails" be sent to users whom are not intended to be included in the newly defined dynamic group—clearly an undesirable outcome.

Accordingly, in addition to enabling the administrator to define group rule parameters for a dynamic group rule, the group rule management portal also enables the administrator to define a subgroup of user accounts against which the group rule parameters can be selectively applied for validation purposes. In some embodiments, the group rule parameters define a rule syntax in the form of a binary expression that results in a true or false outcome and that is comprised of a property, an operator, and a value. For example, an exemplary rule syntax expression of "user.department -eq 'Engineering'" may result in a true outcome when analyzed against individual user accounts for which the directory attribute of "user.department" is set as being equal to "Engineering." Furthermore, the subgroup of user accounts may be defined by the administrator by searching and/or browsing through the user directory and specifically selecting user accounts that are expected to return a particular outcome when analyzed against the group rule parameters. For example, the administrator may select first user accounts that are expected to return an outcome of true (and therefore be included within the full membership list) and/or second user accounts that are expected to return an outcome of false (and therefore be excluded from the full membership list).

Then, once the administrator has provided the group rule parameters and subgroup definition, the dynamic group generating service generates a subgroup validation report that indicates the resulting outcomes of individual user accounts (that are identified within the subgroup definition) being analyzed with respect to the group rule parameters. For example, if the subgroup definition identifies a first user account and a second user account, then the subgroup validation report may indicate a first outcome corresponding to the first user account and a second outcome corresponding to the second user account. In the event that the first outcome and second outcome are consistent with the administrator's intentions, then the subgroup validation report may serve as confirmation as to the efficacy of the group rule parameters. In contrast, if the first outcome and/or second outcome deviate from the administrator's intentions, then the subgroup validation report may serve as an indication that the group rule parameters have a rule syntax error that should be addressed prior to deploying the corresponding dynamic group rule.

Once the administrator is satisfied with the outcomes reported in the subgroup validation report, she may then decide to fully deploy the dynamic group rule. To do so, she may utilize the group rule management portal to cause a group rule deployment instruction to be transmitted to the dynamic group generating service. Then, in response to receiving this group rule deployment instruction, the dynamic group generating service may generate the full membership list by analyzing the group rule parameters against the organization's entire user directory.

The techniques disclosed herein provide a number of technical benefits. For instance, analyzing the group rule parameters against an individual user account to determine whether attribute values for that individual user account satisfy the group rule parameters inherently requires some amount of computing resources. For example, each discrete determination as to whether an individual user account satisfies the group rule parameters will require some number of processing cycles to be performed and/or some amount of memory to be allocated to generate a true or false outcome. Furthermore, generation of a full membership list typically includes exhaustively parsing an organization's entire user directory. Thus, under circumstances where an organization has a large number of employees having a corresponding entry within a user directory, generating the subgroup validation report may require significantly fewer computing resources as compared to generating the full membership list.

To illustrate this point, presume that the amount of processing cycles performed to analyze any individual account is roughly fixed. Further presume that an organization has a total of fifty thousand ("50,000") employees and that while validating a particular dynamic group rule an administrator defines a subgroup that includes a mere ten ("10") user accounts that are expected to be included within a full membership list and another ten ("10") user accounts that are expected to be omitted from the full membership list. Under these exemplary but nonlimiting circumstances, generating the subgroup validation report will require twenty-five hundred ("2500") times fewer processing cycles as compared to generating the full membership list. Thus, utilization of the techniques described herein can increase the efficiency of a dynamic group rule computing system by reducing the number of times in which individual user accounts are analyzed against group rule parameters during creation of and validation of a new (or validation of an existing) dynamic group rule. Thus, the usage of various computing resources such as processing resources, memory resources, and networking resources can be significantly reduced.

The efficiencies derived from the analysis described above can also lead to other efficiencies. In particular, by automating a number of different processes for generating status notifications, user interaction with the computing device can be improved. The reduction of manual data entry and improvement of user interaction between a human and a computer can result in a number of other benefits. For instance, by reducing the need for manual entry, inadvertent inputs and human error can be reduced. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes a dynamic group generation service that enables an administrator to initiate selective validation of a subgroup of users against group rule parameters for a dynamic group rule. In this way, the administrator can quickly and intuitively verify the efficacy of the group rule parameters without requiring an organization's entire user directory be exhaustively parsed (which is both time consuming and requires significant computing resources). As an initial matter, the administrator may define group rule parameters for a dynamic group rule and a subgroup definition that includes individually selected user accounts which the administrator either expects will be included within and/or excluded from a full membership list for the dynamic group rule. Then, a subgroup validation report is generated to inform the administrator whether or not individual user accounts from the administrator-defined subgroup of user accounts satisfy the group rule parameters and, therefore, will be included within the full membership list of the dynamic group rule. Under circumstances in which the subgroup validation report indicates that the group rule parameters are including and/or excluding user accounts from the full membership list as intended, then the administrator may understand the subgroup validation report as providing confirmation as to the efficacy of the group rule parameters (e.g., confirmation that she has properly written a rule syntax). In contrast, if the subgroup validation report indicates that the group rule parameters are not including and/or excluding user accounts as intended, then the administrator may analyze the situation to diagnose and mitigate the issue (e.g., by adjusting the rule syntax as needed).

Figure 1:
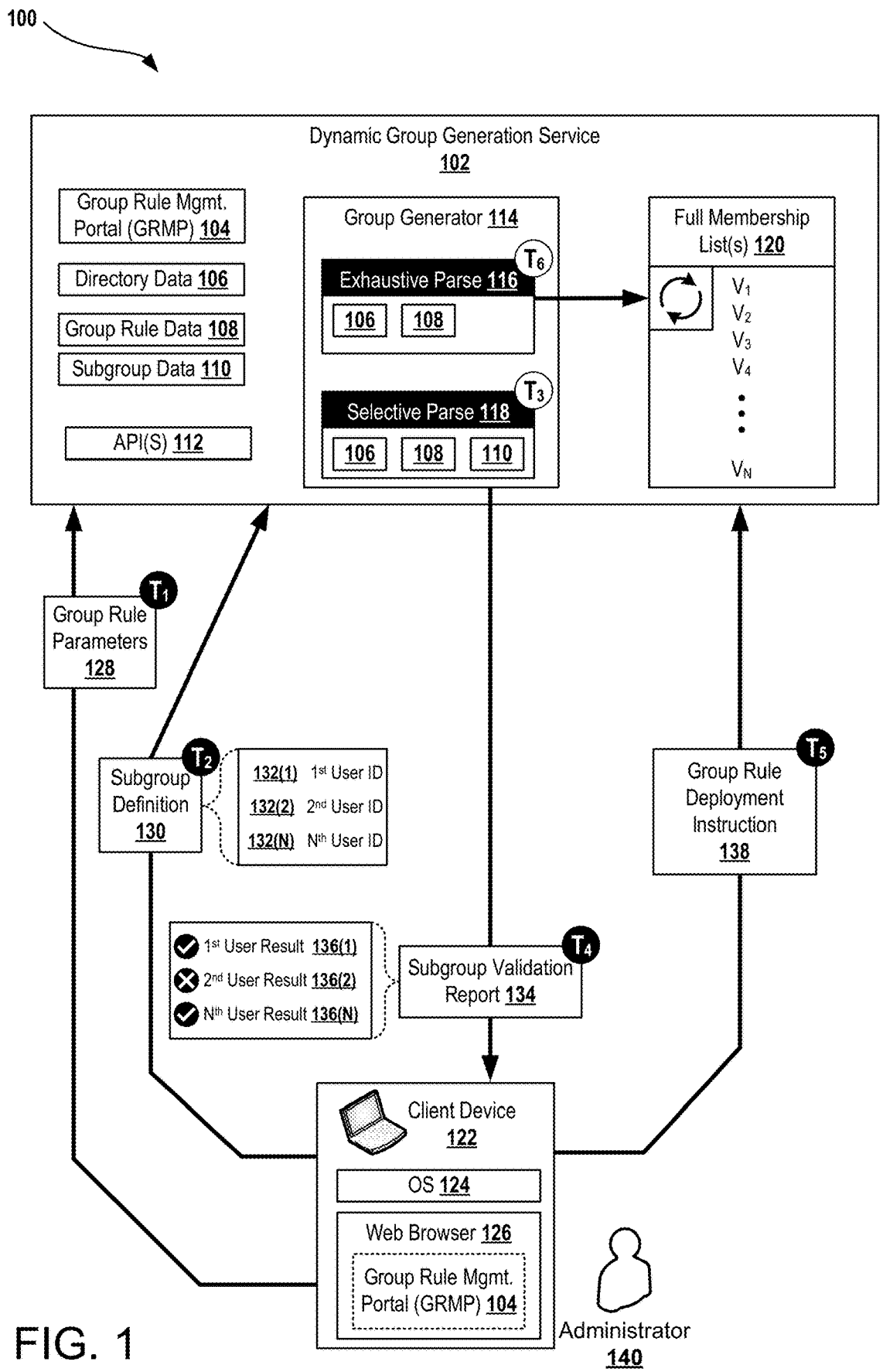
FIG. 1 illustrates an example data flow scenario with respect to a system that deploys a dynamic group generation service to generate a subgroup validation report based on group rule parameters and a subgroup definition provided by an administrator.

To illustrate aspects of the techniques disclosed herein: FIG. 1 illustrates a data flow scenario of a system that implements a dynamic group generation service for generating subgroup validation reports as described herein. FIGS. 2A-5B illustrate various graphical user interfaces (GUI) and corresponding user inputs for defining group rule parameters, defining subgroup definitions, displaying subgroup validation reports, and other aspects of implementing the techniques described herein. Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1-5B, may be combined in any order and/or in parallel in accordance with the present disclosure. Other processes and/or operations and/or functionalities described throughout this disclosure shall be interpreted accordingly.

Turning now to FIG. 1, an example data flow scenario is illustrated with respect to a system 100 that deploys a dynamic group generation service 102 to generate a subgroup validation report 134 based on group rule parameters 128 and a subgroup definition 130 provided by an administrator 140. The dynamic group generation service 102 may be configured to expose a group rule management portal 104 to enable the administrator 140 to define various aspects of the group rule parameters 128 and/or subgroup definition 130. For example, the administrator 140 may log into the group rule management portal 104 via a client device 122. Additionally, the group rule management portal 104 may be configured to communicate aspects of a subgroup validation report 134 to the administrator 140 via the client device 122. In the illustrated embodiment, the dynamic group generation service 102 executes computer executable code that is designed to facilitate aspects and/or functionalities of the group rule management portal 104. Here, the dynamic group generation service 102 provides the administrator 140 with access to the group rule management portal 104 through a web browser 126 that is being executed by an operating system 124 on a client device 122 (e.g., a laptop computer, a smart phone, etc.). In other implementations, access to the group rule management portal 104 may be provided by other means.

The dynamic group generation service 102 may store or otherwise have access to directory data 106 associated with an organization (e.g., a company or enterprise). The directory data 106 may define user attributes and associated values for a plurality of users (e.g., employees) of the organization. For example, the directory data 106 may include data entry fields for a plurality of user attributes such as, for example, a "Department" user attribute that indicates which department a user belongs to, a "Location" user attribute that indicates one or more geographic locations at which a user is employed and/or stationed, a "Grade/Level" attribute that indicates a rank of the user within an organizational structure, and so on. An exemplary form of the directory data 106 includes, but is not limited to, MICROSOFT Azure Active Directory data that defines a registry of users for the organization. The registry that is defined in the directory data 106 may include individual data objects (e.g., Active Directory objects) for the individual users. These individual data objects may be used to store values for the individual user attributes.

Additionally, the dynamic group generation service 102 may store or otherwise have access to group rule data 108 associated with the organization. The group rule data 108 may define attribute-based rules that enable the dynamic group generation service 102 to facilitate dynamic membership for groups. As used herein, membership in a particular group of interest (as defined by an attribute-based group rule) being "dynamic" refers to the membership of that particular group of interest being periodically updated to account for changes which occur to the directory data 106 over time. For example, under circumstances in which a particular group of interest is defined by the rule syntax expression of "user.department -eq 'Engineering,'" membership in this group of interest may be aptly described as being dynamic if the dynamic group generation service 102 automatically (e.g., without manual user intervention) and periodically updates a corresponding full membership list 120 to reflect current (e.g., up-to-date) directory data 106. One of the key benefits of dynamic group membership is a significant reduction of the administrative overhead needed to effectively utilize attribute-based group rules. This is because once a "dynamic" attribute-based group rule is properly defined and implemented, administrators are not burdened with having to update membership by manually adding and/or removing users as their membership in the group becomes appropriate and/or ceases to be appropriate.

With respect to the exemplary data flow scenario shown in FIG. 1, at time $T_1$ the administrator 140 provides the dynamic group generation service 102 with group rule parameters 128 for a dynamic group rule. For example, the administrator 140 may be in the process of setting up a new dynamic group rule that is intended to include and be limited to employees (of the organization) which belong to a department entitled "Engineering." In this example, the administrator 140 may access the group rule management portal 104 (via the client device 122) to define group rule parameters 128 using a rule syntax in which a property is set to "Department," an operator is set to "Equals," and a value is set to "Engineering." Thus, when the dynamic group generation service 102 analyzes the directory data 106 to populate a full membership list 120 for the new dynamic group rule, each individual user account for which the Department attribute is set to Engineering will return an outcome of true and will be added to the full membership list 120. In contrast, each individual user account for which the Department attribute is not set to Engineering will return an outcome of false and will not be added to the full membership list 120.

At time $T_2$, the administrator 140 provides a subgroup definition 130 to the dynamic group generation service 102 by way of the group rule management portal 104. For example, as described in relation to FIG. 4, the group rule management portal 104 may include an input field that is usable to search through the organization's entire user directory to manually select specific user accounts 132 to include within the subgroup definition 130. As illustrated, the subgroup definition 130 identifies a first user account 132(1), a second user account 132(2), an Nth user account 132(N). These specific user accounts 132 may be selected due to being expected to return a particular outcome when analyzed against the group rule parameters 128. For example, the administrator 140 may select one or more user accounts that are expected to return an outcome of "true" and therefore be included within the full membership list 120. Additionally, or alternatively, the administrator 140 may select one or more other user accounts that are expected to return an outcome of "false" and therefore be excluded from the full membership list 120.

Dynamic group rules are a powerful tool that when used properly can greatly reduce the administrative overhead associated with managing groups of interest. For example, dynamic group rules may be used to selectively direct mass email messages to users that belong to specific departments and/or are located at a specific office building and/or are at least a specific level within an organizational hierarchy. However, since dynamic group rules can require complicated rule syntax and modern organizations have highly complex organizational structures, properly defining a rule syntax so that a full membership list 120 of the group is populate accurately (and remains accurate for that matter as the directory data 106 changes) can be an error prone process. For this reason, it may be desirable to validate the efficacy of the group rule parameters 128 for a new dynamic group rule being created by the administrator 140 prior to deploying that dynamic group rule. In particular, the administrator 140 may wish to confirm that the rule syntax she has written for a new dynamic group rule will achieve the desired result prior to fully deploying the dynamic group rule which will cause the full user directory to be exhaustively parsed to generate the full membership list 120.

Accordingly, in order to assist with validating the efficacy of the group rule parameters 128, at time $T_3$ the dynamic group generation service 102 generates a subgroup validation report 134. As illustrated, generating the subgroup validation report 134 may include deploying a group generator 114 to perform a selective parse 118 of the directory data 106 based on both of the group rule data 108 and the subgroup data 110. More specifically, the selective parse 118 may include analyzing the group rule parameters 128 against only those user accounts 132 that are specifically identified within the subgroup definition 130. Thus, as described above, since fewer user accounts 132 are analyzed to generate the subgroup validation report 134 than are analyzed to generate the full membership list 120, generating the subgroup validation report 134 requires fewer computing resources as compared to generating the full membership list 120. As a specific but nonlimiting example, if the organization has total of fifty thousand ("50,000") employees and the subgroup definition 130 only identifies twenty ("20") user accounts, generating the subgroup validation report 134 will require twenty-five hundred ("2500") times fewer processing cycles as compared to generating the full membership list 120. As used herein, the term "group generator" may refer to a software module that is configured to analyze user accounts 132 with respect to group rule parameters 128 to generate subgroup validation reports 134 as described herein and also to continuously and/or periodically update a full membership list 120. In some embodiments, the group generator may be configured to update the full membership list 120 each day (e.g., during off-peak hours), every several minutes (e.g., every 5 minutes), or continuously (e.g., by beginning to re-parse the entire user directory immediately upon finishing an exhaustive parse).

At time T4, the dynamic group generation service 102 provides this subgroup validation report 134 to the client device 122 which then displays or otherwise communicates aspects of the subgroup validation report 134 to the administrator 140. As illustrated, the subgroup validation report 134 may include a plurality of results 136 that individually correspond to the individual user accounts 132 included within the subgroup definition 130. For example, as illustrated, the subgroup validation report 134 includes a first result 136(1) that indicates whether the group rule parameters 128 are satisfied by the directory attributes of the first user account 132(1), a second result 136(2) that indicates whether the group rule parameters 128 are satisfied by the directory attributes of the second user account 132(2), and an Nth result 136(N) that indicates whether the group rule parameters 128 are satisfied by the directory attributes of the Nth user account 132(N). In some embodiments, each individual result 136 may be an outcome of true or false. In this way, the subgroup validation report 134 may serve as confirmation as to the efficacy (or lack thereof) of the group rule parameters 128. For example, if the results 136 provided in the subgroup validation report 134 are consistent with the design intentions of the administrator 140, then the administrator 140 may view the subgroup validation report 134 as confirmation that the rule syntax she wrote into the group rule parameters 128 is accurate. In contrast, if the results 136 provided in the subgroup validation report 134 are inconsistent with the design intentions of the administrator 140, then the subgroup validation report 134 may serve as an indication that the group rule parameters 134 have an error that should be addressed.

Then, at time T$_5$, the administrator 140 causes a group rule deployment instruction 138 to be transmitted from the client device 122 to the dynamic group rule generation service 102. For example, upon having reviewed the subgroup validation report 134, the administrator 140 may be confident that the group rule parameters 128 are accurately written so as to effectuate her design intentions for the dynamic group rule. Then, in response to the group rule deployment instruction 138, the dynamic group generation service 102 may deploy the group generator 114 to perform an exhaustive parse 116 based on the directory data 106 and the group rule data 108. Then, after an initial exhaustive parse 116, the group generator 114 may re-analyze the directory data 106 to generate sequential instances of the full membership list 120. For example, as illustrated, the full membership lists 120 include a plurality of sequential instances represented as Vi through VN.

Figure 2A:
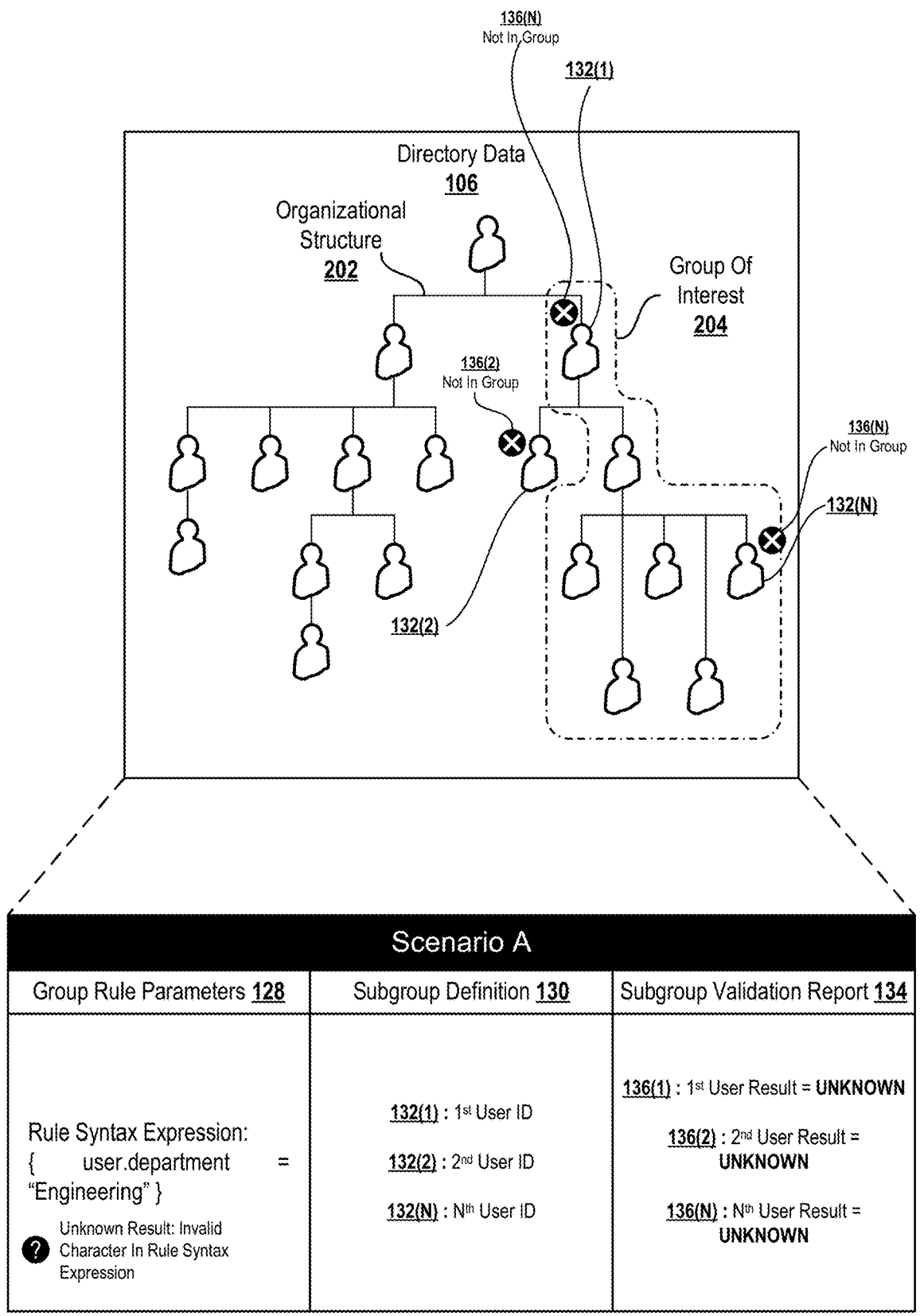
FIG. 2A illustrates an example scenario "A" in which a subgroup validation report indicates that none of the users included within a subgroup definition have user attributes that satisfy a first iteration of the group rule parameters.
Figure 2B:
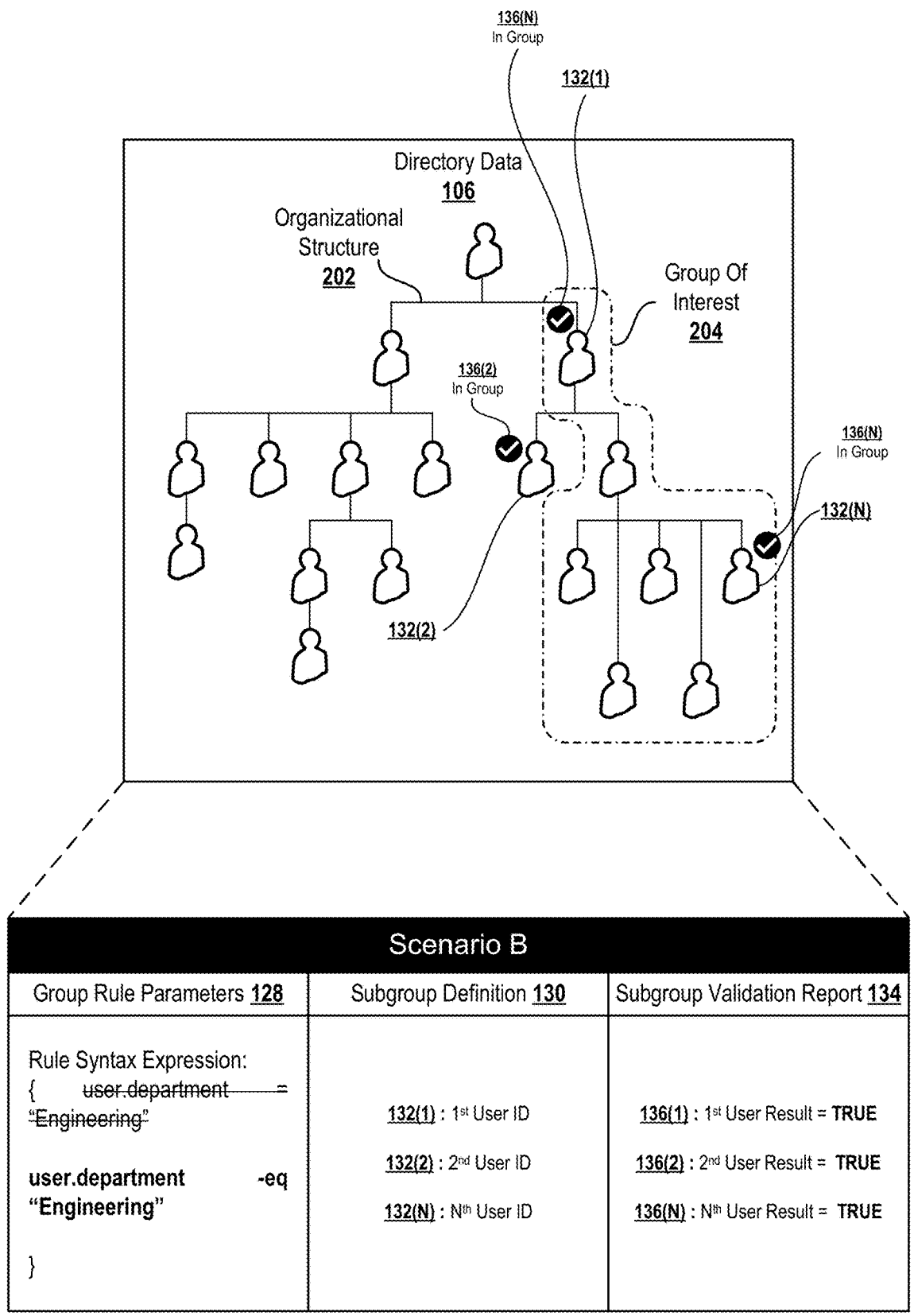
FIG. 2B illustrates an example scenario "B" in which a subgroup validation report indicates that all of the users included within the subgroup definition of FIG. 2A have user attributes that satisfy a second iteration of the group rule parameters.
Figure 2C:
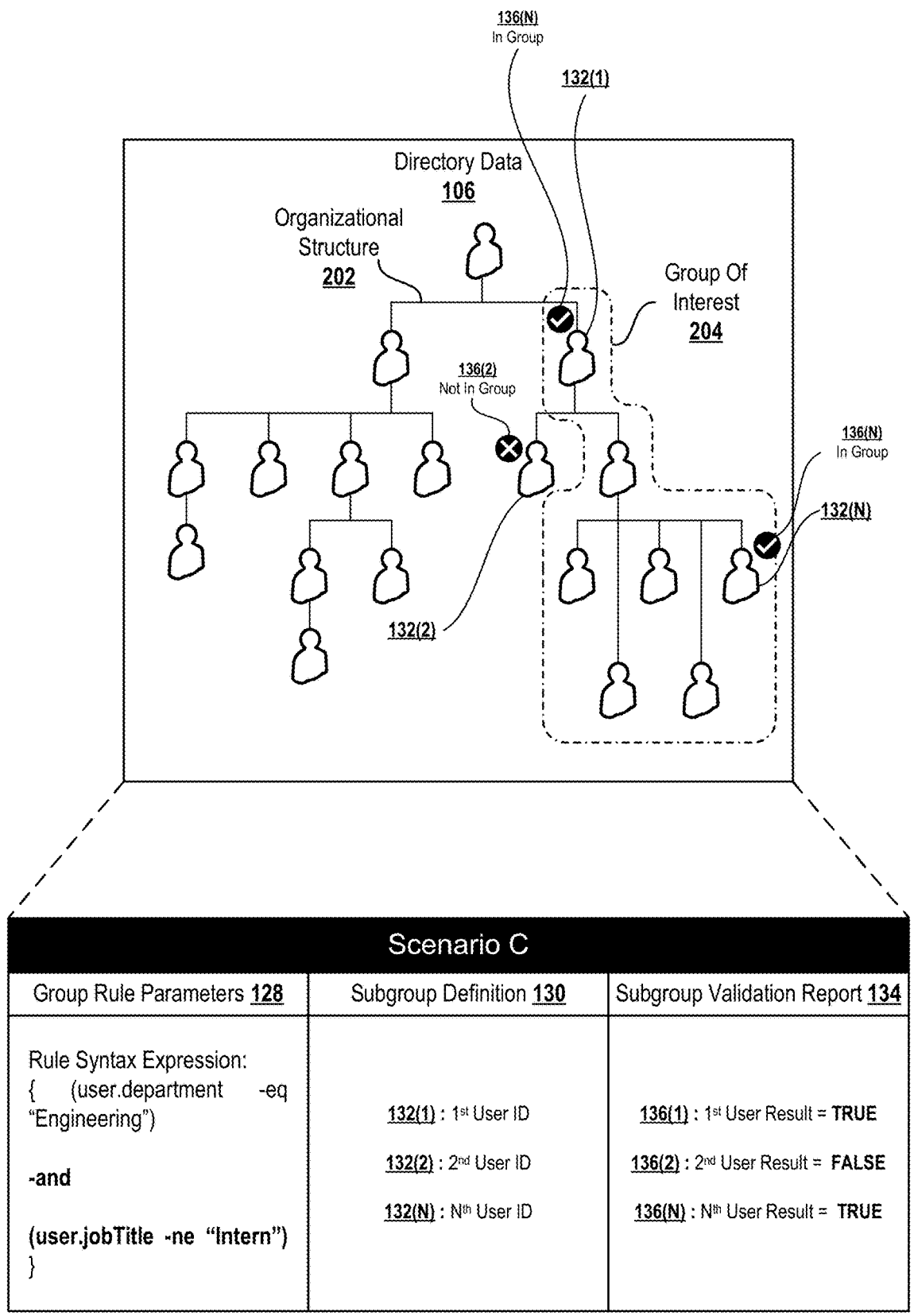
FIG. 2C illustrates an example scenario "C" in which a subgroup validation report indicates that two users of the subgroup definition of FIG. 2A have user attributes that satisfy a third iteration of the group rule parameters 128 while another user of the subgroup definition does not have user attributes that satisfy the third iteration of the group rule parameters.

FIGS. 2A through 2C provide a sequence of example scenarios to illustrate aspects of how generation of one or more subgroup validation reports 134 can help to facilitate identification of issues with group rule parameters 128 for a dynamic group rule without causing the group generator 114 to perform an exhaustive parse 116. The example scenarios A through C described in FIGS. 2A through 2C, respectively, are each described in reference to directory data 106 that defines an organizational hierarchy 202 including eighteen users 132. Each of the eighteen users 132 are individually illustrated but only those three users 132 that are included within the subgroup definition 130 are individually labeled. Furthermore, the example scenarios A through C are each described in relation to a group of interest 204 for which a dynamic group rule is being newly created by an administrator 140. For purposes of the present discussion, the dynamic group rule that is being created during scenarios A through C is intended to include all persons within the organizational structure 202 that are members of an "Engineering" department that is headed by a first user 132(1). Furthermore, the dynamic group rule is intended to be limited to full time employees of the organization.

Referring now specifically to FIG. 2A, illustrated is an example scenario "A" in which a subgroup validation report 134 indicates that none of the users 132 included within a subgroup definition 130 have user attributes (as defined within the directory data 106) that satisfy a first iteration of the group rule parameters 128. As illustrated, the first iteration of the group rule parameters 128 include a Rule Syntax Expression of: {user.department="Engineering"}. Here, the Rule Syntax Expression can be parsed into the respective parts of a property of "user.department" set as a string value; an operator of "=" set as an operator syntax; and a value of "Engineering" set as a string value. It can be appreciated from scenario "A" that the administrator 140 intends for this first iteration of the group rule parameters 128 to return a result of TRUE for any individual user 132 within the organizational structure 202 that has a string value that equals "Engineering" for an attribute of "user.department." However, for purposes of the present discussion, presume that the correct operator syntax for an equals comparison is "-eq" rather than "=" as included in the first iteration of the group rule parameters 128. Thus, in example scenario "A" the administrator 140 has made a seemingly minor error that if left unmitigated would result in the intended dynamic group rule being completely inoperable.

In accordance with the techniques herein, rather than fully deploying the dynamic group rule and triggering the group generator 114 to perform an exhaustive parse 116, the administrator 140 provides the dynamic group generation service 102 with a subgroup definition 130 and requests a subgroup validation report 134. As illustrated, the subgroup validation report 134 includes user results 136 indicating whether or not each user identified within the subgroup definition 130 has user attributes which satisfy the first iteration of the group rule parameters 128. For purposes of the present discussion, presume that the administrator 140 intends to define group rule parameters 128 such that each of the first user 132(1) and the Nth user 132(N) will be included within the full membership list 120 (for the newly created dynamic group rule) but that the second user 132(2) will be omitted from the full membership list 120 (e.g., due to the second user 132(2) being an intern rather than a full time employee). Thus, the subgroup validation report 134 will provide the administrator 140 with a clear indication that there is some inadvertent issue within the first iteration of the group rule parameters 128 that will prevent the full membership list 120 from being accurately populated so as to effectuate the design intentions for the newly created dynamic group rule.

Referring now specifically to FIG. 2B, presume that subsequent to example scenario "A" the administrator 140 has analyzed and refined the first iteration of the group rule parameters 128 to generate a second iteration of the group rule parameters 128. Thus, FIG. 2B illustrates an example scenario "B" in which a subgroup validation report 134 indicates that all of the users 132 included within the subgroup definition 130 have user attributes that satisfy the second iteration of the group rule parameters 128.

As illustrated, the second iteration of the group rule parameters 128 include an updated Rule Syntax Expression of: {user.department -eq "Engineering"}. Here, the Rule Syntax Expression can be parsed into the respective parts of a property of "user.department" set as a string value; an operator of "-eq" set as an operator syntax; and a value of "Engineering" set as a string value. Since for purposes of the present discussion the correct operator syntax for an equals comparison for a string value of a specified property is "-eq" it will be appreciated that in creating the second iteration of the group rule parameters 128 the administrator 140 has fixed the Rule Syntax error described in relation to FIG. 2A. Thus, the subgroup validation report 134 that has been generated based on the second iteration of the group rule parameters 128 now indicates that each of the first user 132(1), the second user 132(2), and the Nth user 132(N) have user attributes that will result in inclusion within the full membership list 120 when an exhaustive parse is performed.

Recall that the dynamic group rule being created in scenarios A through C is intended to be limited to full time employees of the organization. For purposes of the present discussion, presume that the second user 132(2) is an intern for the organization rather than a full-time employee. Further presume that the second user 132(2) is included within the subgroup definition 130 for this specific reason (e.g., to ensure that the group rule parameters 128 exclude this second user 132(2) as intended). Thus, in example scenario "B" the administrator 140 has inadvertently defined group rule parameters 132(2) that include only one of two rule expression syntaxes needed to effectuate the design intent for the newly created dynamic group rule. Here, the subgroup validation report 134 serves as a reminder to the administrator 140 that some additional expression will be needed to ensure that the exhaustive parse will omit interns from the full membership list 120.

Referring now specifically to FIG. 2C, presume that subsequent to example scenario "B" the administrator 140 has analyzed and refined the second instance of the group rule parameters 128 to generate a third instance of the group rule parameters 128. Thus, FIG. 2C illustrates an example scenario "C" in which a subgroup validation report 134 indicates that: the first user 132(1) and the Nth user 132(N) have user attributes that satisfy a third iteration of the group rule parameters 128; and that the second user 132(2) does not have user attributes that satisfy the third iteration of the group rule parameters 128.

As illustrated, the third iteration of the group rule parameters 128 include an again updated Rule Syntax Expression of: {(user.department -eq "Engineering") AND (user.jobTitle -ne "Intern")}. Here, the Rule Syntax Expression can be parsed into a first expression and a second expression which are connected by a logical operator of "-and." For purposes of the present discussion the operator syntax of "-ne" is the current syntax for a does not equal comparison for a string value of a specified property. Accordingly, in order for any particular user to be included within the full membership list 120, their corresponding user attributes must satisfy both of the first expression and the second expression of the third iteration of the group rule parameters 128. Here, each user within the subgroup definition 130 is included within the "Engineering" user department but only the second user 132(2) has a job title of intern. Thus, the subgroup validation report 134 shown in scenario C indicates that: user attributes for the first user 132(1) yield a first user result of TRUE; user attributes for the second user 132(2) yield a second user result of FALSE; and user attributes for the Nth user 132(N) yield an Nth user result of TRUE. Thus, scenario C represents circumstances in which the subgroup validation report 134 indicates that the group rule parameters 134 are including and/or excluding user accounts from the full membership list 120 as intended. For this reason, the administrator 140 may understand the subgroup validation report 134 of scenario C to be providing confirmation as to the efficacy of the third iteration the group rule parameters 128 (e.g., confirmation that she has properly written a rule syntax).

The foregoing discussion of the subgroup validation reports 134 of scenarios A and B prompting the administrator 140 to refine the group rule parameters 128 and the scenario C providing the ultimate confirmation of the efficacy of the group rule parameters provides a concrete example of how the techniques described herein can in many cases reduce the amount of computing resources required to effectively implement a dynamic group rule. For example, since there are eighteen total user accounts within the directory data 106, each of which will be analyzed during an exhaustive parse, but the subgroup definition 130 only includes three user accounts, performing a selective parse 118 to generate each subgroup validation report 134 consumes six times fewer computing resources than performing an exhaustive parse 116 to generate a full membership list 120. Furthermore, since two updates were required before the administrator 140 perfectly defined the group rule parameters 128, six fewer computer resources were utilized twice (e.g., once in relation to scenario A and once in relation to scenario B). Since dynamic group rules can require complicated rule syntax and modern organizations have highly complex organizational structures, properly defining a rule syntax so that a full membership list 120 of the group is populate accurately (and remains accurate for that matter as the directory data 106 changes) can take many more than two iterations. Furthermore, organizational structures are oftentimes tens of thousands of times larger than that described in relation to FIGS. 2A through 2C. Thus, in many real-life practical applications, performing a selective parse 118 will consume hundreds or even thousands of times fewer computing resources than performing an exhaustive parse 116.

To concretely illustrate the manner in which the technologies described herein can reduce processing cycles consumed while an administrator 140 generates iterations of group rule parameters, suppose that analyzing group rule parameters against any individual user account requires X processing cycles. Further presume that the directory data to be exhaustively parsed includes 50,000 user accounts. Under these circumstances, if the administrator 140 generates five iterations before properly defining group rule parameters 128 and a subgroup definition includes 20 user accounts, then it will take 10,000 times fewer processing cycles to arrive at the properly defined fifth iteration of the group rule parameters 128.

Figure 3:
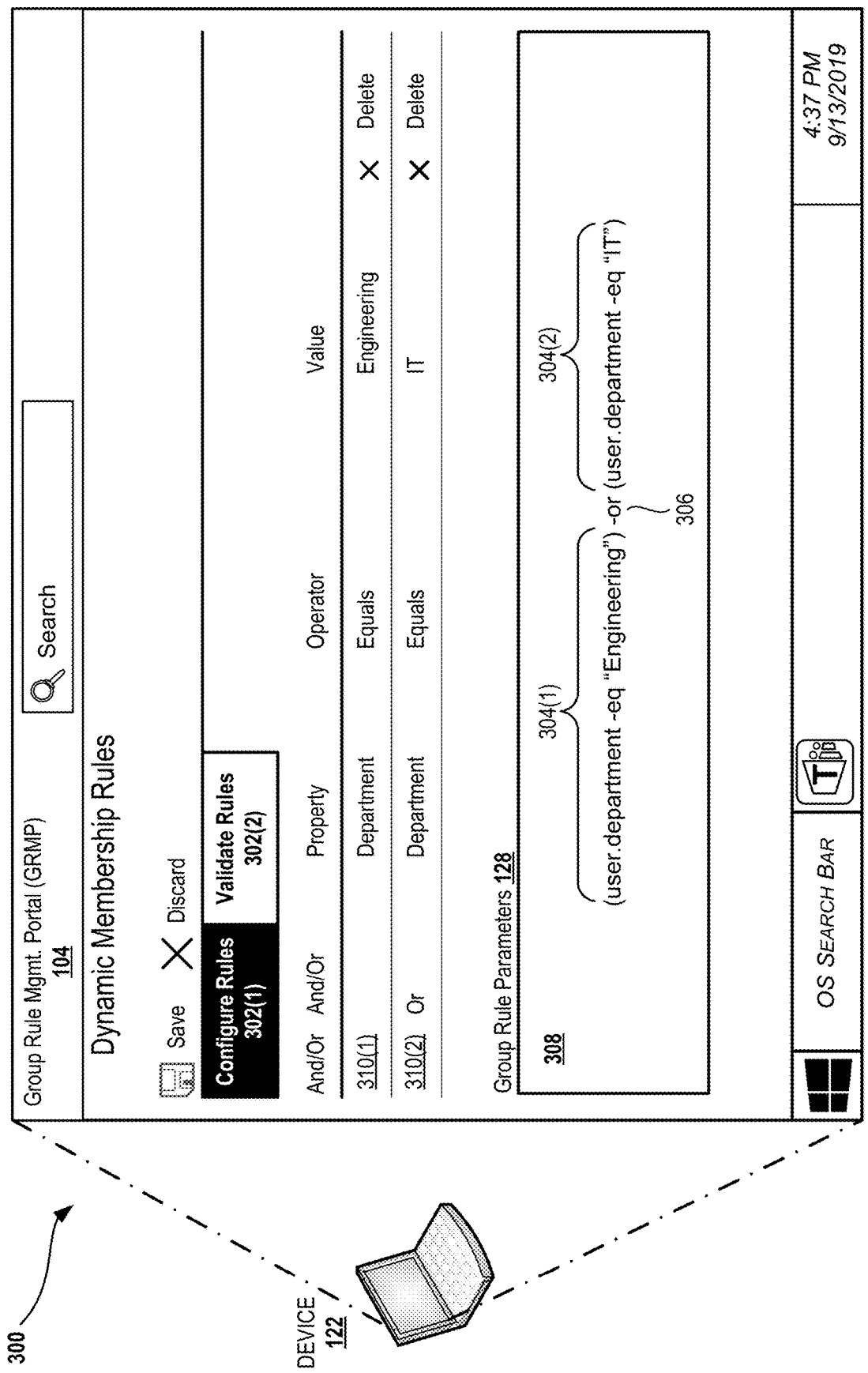
FIG. 3 illustrates an exemplary graphical user interface (GUI) that can be displayed on the client device to provide access to a group rule management portal described herein.

FIG. 3 illustrates an exemplary graphical user interface (GUI) 300 that can be displayed on the client device 122 to provide access to the group rule management portal 104 described herein. The GUI 300 includes one or more user interface elements (UIEs) 302 that expose various functionalities associated with configuring rules (e.g., dynamic group rules) and validating rules. In particular, the GUI 300 includes a first UIE 302(1) that is selectable to expose rule configuration functionalities and a second UIE 302(2) that is selectable to expose rule validation functionalities.

As illustrated, the GUI 300 is shown with the first UIE 302(1) highlighted and with functionalities associated with configuring rules exposed. These configure rules functionalities enable an administrator 140 to define the group rule parameters 128 (e.g., in the form of one or more rule syntax expressions 304). As illustrated, the group rule parameters 128 include a first rule syntax expression 304(1) that is logically connected to a second rule syntax expression 304(2) by way of an "or" logical operator 306. In some embodiments, the GUI 300 facilitates manually defining the group rule parameters 128. For example, the administrator 140 may manually type the full rule syntax (e.g., including the first rule syntax expression 304(1) and second rule syntax expression 304(2) along with the logical operator 306) into a user entry field 308. Additionally, or alternatively, the group rule parameters 128 may be defined by way of one or more syntax generator rows 310 which assist with rule syntax generation. For example, as illustrated the first rule syntax expression 304(1) has been defined by way of a first syntax generator row 310(1) and the second rule syntax expression 304(2) has been defined by way of a second syntax generator row 310(2).

Figure 4:
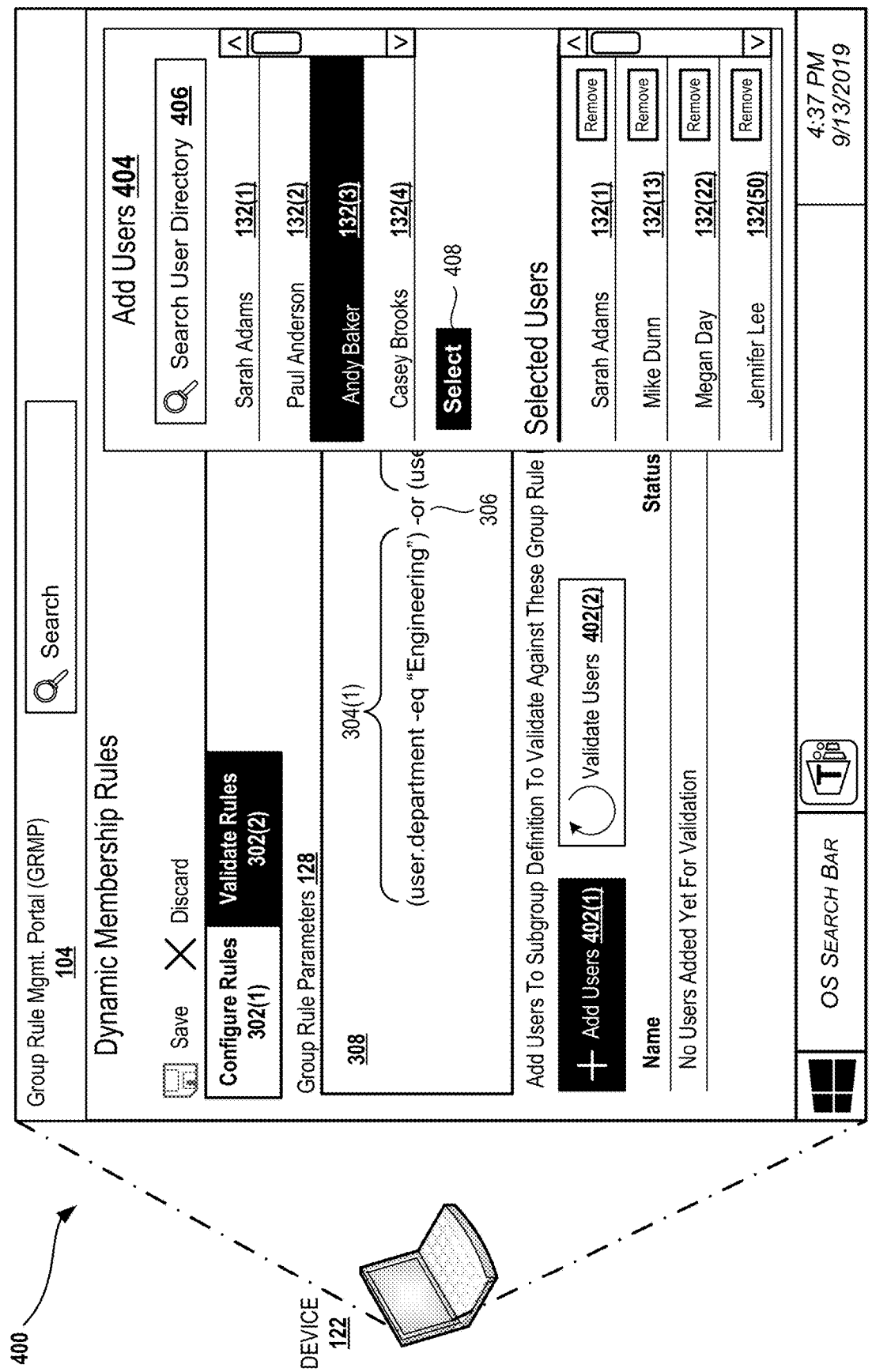
FIG. 4 illustrates an exemplary GUI that is shown with functionalities associated with validating rules exposed.

Turning now to FIG. 4, illustrated is an exemplary GUI 400 that is shown with the second UIE 302(2) highlighted and with functionalities associated with validating rules exposed. These validate rules functionalities enable an administrator 140 to define a subgroup definition 130 and, based thereon, to request a subgroup validation report 134 as described herein. As illustrated, the GUI 400 includes a first UIE 402(1) that is selectable to enable the administrator 140 to search for user accounts and add specific user accounts to a subgroup definition 130. For example, selection of the first UIE 402(1) has resulted in an "Add Users" window 404 to be exposed via the client device 122.

The "Add Users" window 404 includes a "Search User Directory" search field 406 that enables the administrator 140 to search through the entire user directory of an organization. As illustrated, a search portion of the "Add Users" window 404 (i.e., a portion of the window 404 above the words "Selected Users") is showing a first user account 132(1) through a fourth user account 132(4). Furthermore, within the search portion, a third user account 132(3) (which corresponds to a user named "Andy Baker") is currently highlighted such that selection of a "Select" UIE 408 will cause the third user account 132(3) to be added to the subgroup definition 130. The "Add Users" window 404 further includes a "Selected Users" portion (i.e., a portion of the window 404 including and below the words "Selected Users") which indicates those specific user accounts which have already been added to the subgroup definition 130. Furthermore, next to each row that identifies a particular user account 132 that has been selected for inclusion within the subgroup definition 130 is a "Remove" UIE that is selectable to remove the corresponding user account 132 from the subgroup definition 130.

Using the "Add Users" Window 404, the administrator 140 may select one or more user accounts that she expects or intends to be included within the full membership list 120. For example, she may select a few user accounts for specific persons that are known to be within the Engineering group and/or another few for user accounts for specific persons that are known to be within the IT group. Additionally, or alternatively, the administrator 140 may select one or more other user accounts that she expects to be excluded from the full membership list 120. For example, she may select a few user accounts for specific persons that are known to not be members of either the Engineering group or the IT group. Then, once these user accounts have all been added to the subgroup definition 130, she may request a subgroup validation report that indicates whether or not individual user accounts from the subgroup of user accounts satisfy the group rule parameters and, therefore, will be included within the full membership list of the dynamic group rule.

Figure 5A:
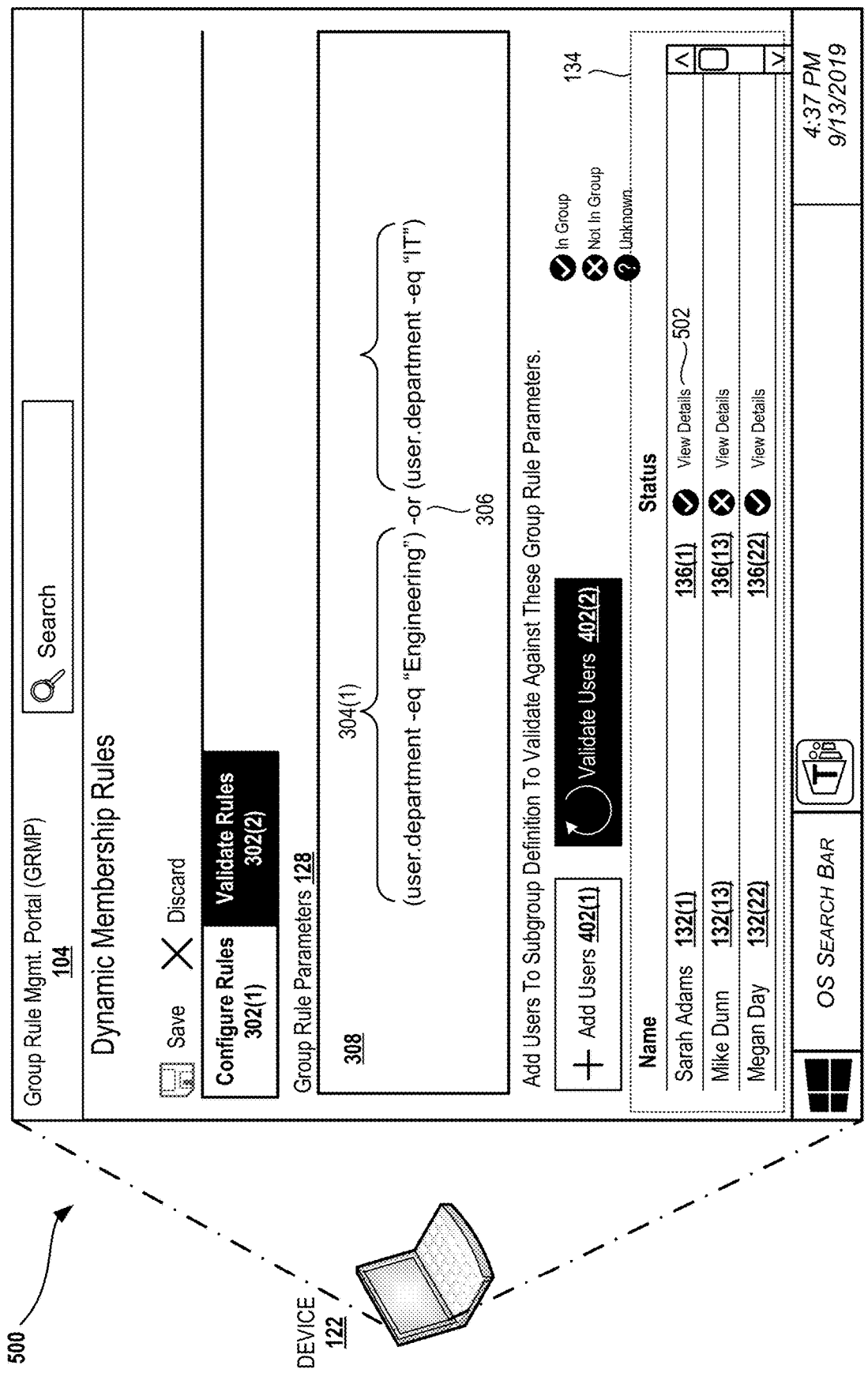
FIG. 5A illustrates a GUI in which a "Validate Users" UIE has been selected to cause the group generator to perform a selective parse.
Figure 5B:
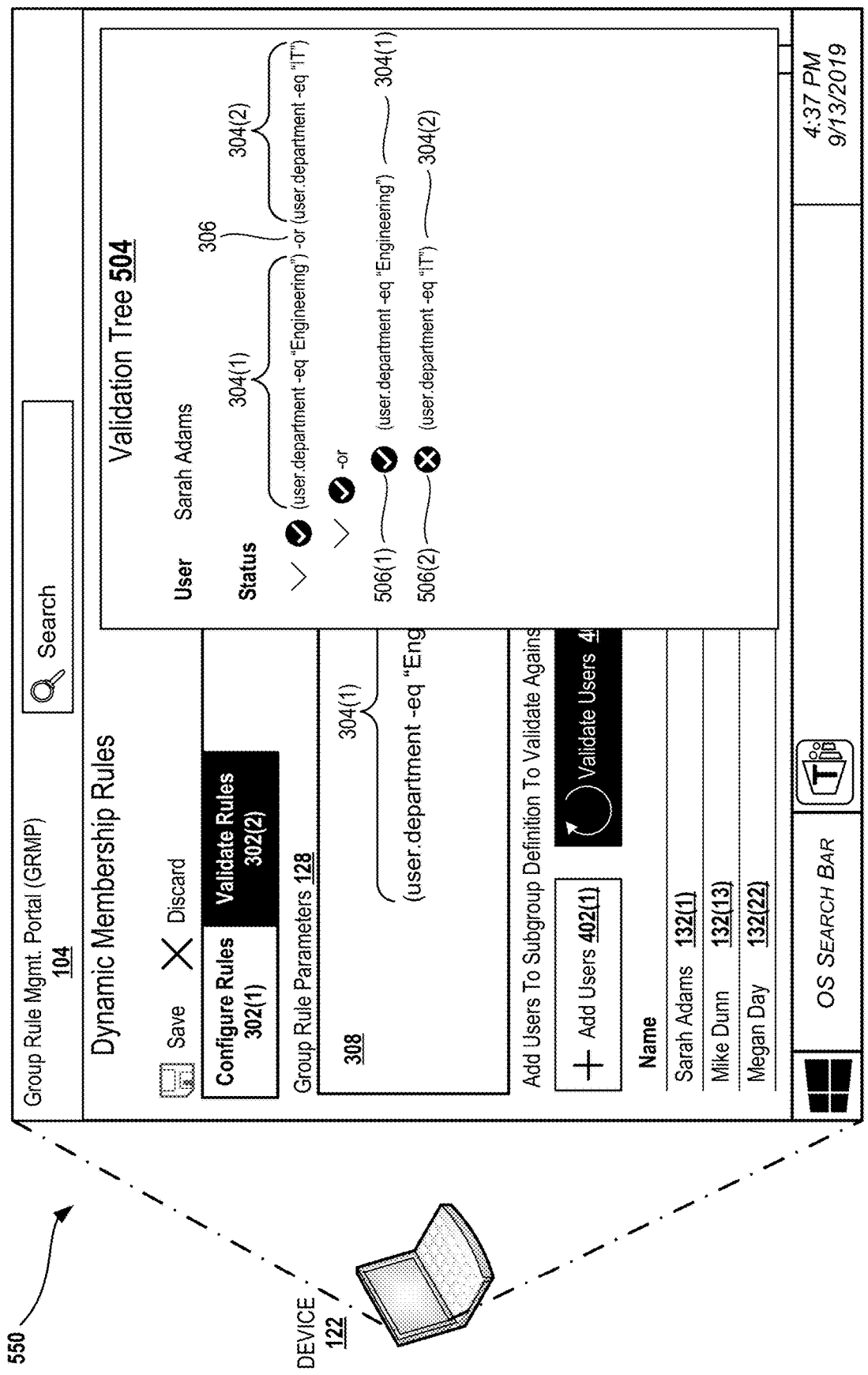
FIG. 5B illustrates a validation tree that includes single syntax expression validation results indicating returned outcomes for individual syntax expressions of the group rule parameters.

Turning now to FIGS. 5A and 5B, illustrated are exemplary GUIs that communicate various aspects of the subgroup validation reports 134 as described herein. In particular, FIG. 5A illustrates a GUI 500 in which a "Validate Users" UIE 402(2) has been selected to cause the group generator 114 to perform a selective parse 118. In some embodiments, the selective parse 118 is based on the subgroup definition 130 (e.g., that was generated via the "Add Users" window 404) and the group rule parameters 128 (e.g., that were defined by way of the GUI 300 of FIG. 3). As illustrated in FIG. 5A, the selective parse 118 has resulted in generation of a subgroup validation report 134 that includes individual results 136 corresponding to each individual user account 132 included within the subgroup definition 130. For clarity, it is worth noting that the number within the parenthetical associated with the user accounts 132 indicates the alphabetical ranking of the user account within the user directory of the organization. For example, "Megan Day" is alphabetically the $22^{nd}$ user within the user directory. Furthermore, the parenthetical associated with the user results 136 matches that of the corresponding user account.

In the illustrated but non-limiting example, the GUI 500 is displaying aspects of the subgroup validation report 134 which communicate to the administrator 140 that based on the currently defined group rule parameters 128 of {(user.department -eq "Engineering") or (user.department -eq "IT")}, the directory data 106 has user attributes for each of "Sarah Adams" and "Megan Day" that satisfy the group rule parameters 128 and so these users will be included within the full membership list 120 whereas the user attributes for "Mike Dunn" do not satisfy the group rule parameters 128 and so this user will not be included within the full membership list 120.

Turning now to FIG. 5B, illustrated is a validation tree 504 that includes single syntax expression validation results 506 indicating returned outcomes for individual syntax expressions 304 of the group rule parameters 128. As illustrated, the validation tree 504 may include an indication of a specific user account to which the validation tree 504 corresponds. Here, the validation tree 504 corresponds to the first user account 132(1) for the user named "Sarah Adams."

In some embodiments, the validation tree 504 indicates a status of the group rule parameters 128 as a whole in addition to individual statuses of the individual parts or components of the group rule parameters 128. For example, as illustrated, the validation tree 504 indicates that the status of the group rule parameters 128 as a whole is that the directory attributes for the first user account 132(1) satisfy the group rule parameters 128. Furthermore, the validation tree 504 also indicates statuses for the logical operator 306 and each of the first rule syntax expression 304(1) and the second rule syntax expression 304(2). Specifically, the validation tree 504 indicates that the first rule syntax expression 304(1) returns an outcome of TRUE (as indicated by the check symbol) and that the second rule syntax expression 304(2) returns an outcome of FALSE (as indicated by the X symbol). Furthermore, based on these two outcomes, the validation tree 504 further indicates that the logical operator 306 returns an outcome of TRUE also which leads to the group rule parameters 128 as a whole being satisfied. Thus, the validation tree 504 indicates not only that the first user account 132(1) will be included within the full membership list 120 but also why this is the case.

In some embodiments, the validation tree 504 is exposed via the client device 122 in response to a user input selection of a UIE 502 that corresponds to an individual user result 136. For example, as illustrated in FIG. 5A, a "View Details" UIE 502 is rendered in association with the first user result 136(1) that indicates that the user named "Sarah Adams" will be included within the full membership list 120 associated with the dynamic group rule. Furthermore, upon the administrator 140 selecting the "View Details" UIE 502 (e.g., by clicking the UIE 502 with a mouse curser), the validation tree 504 shown in FIG. 5B will be rendered to provide further insight into specifically why "Sarah Adams" will be included within the full membership list 120.

Figure 6:
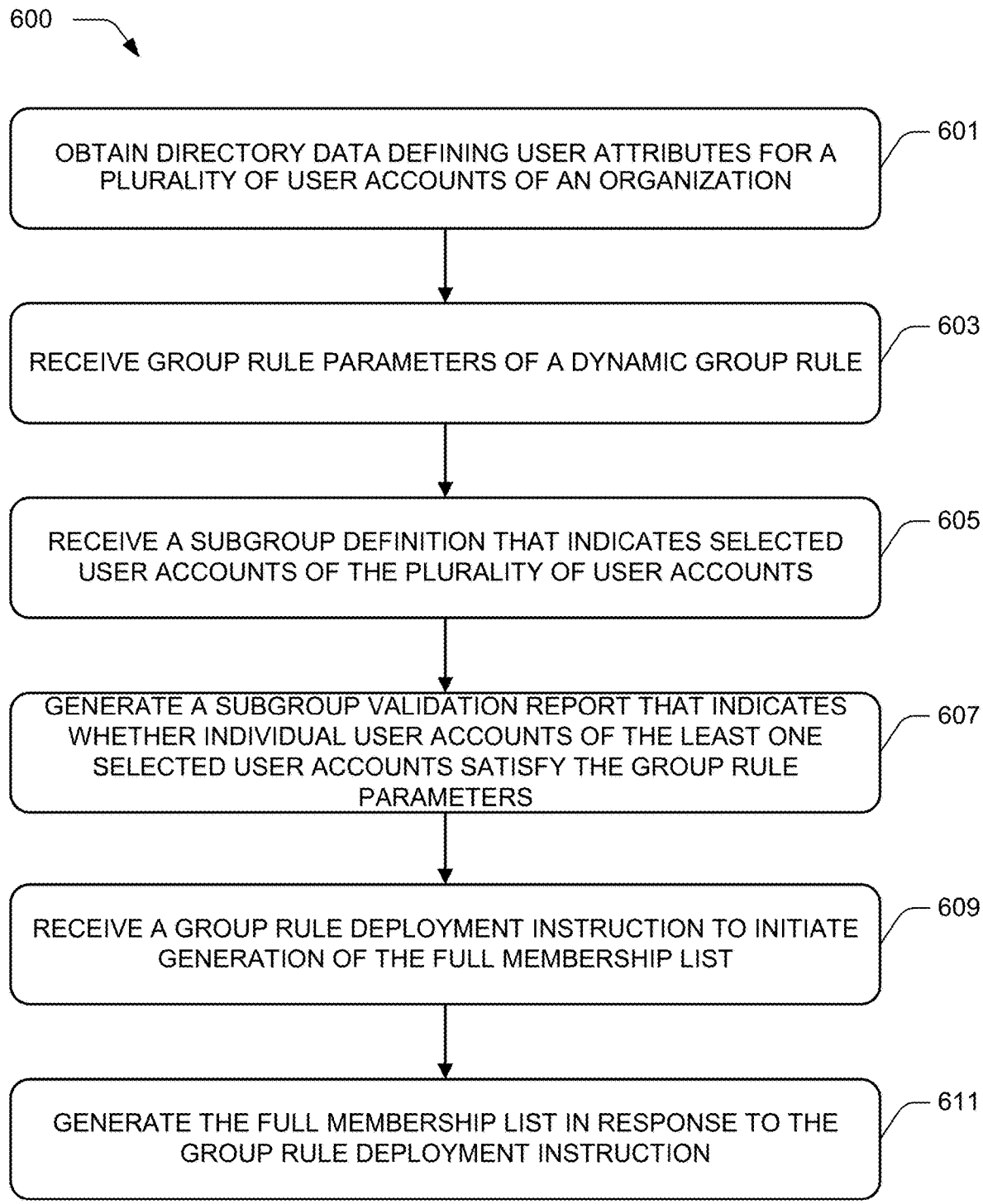
FIG. 6 is a flow diagram of an illustrative process to a dynamic group generation service to generate a subgroup validation report indicating whether selected user accounts satisfy group rule parameters of a dynamic group rule.

FIG. 6 is a flow diagram of an illustrative process 600 to a dynamic group generation service 102 to generate a subgroup validation report indicating whether selected user accounts satisfy group rule parameters of a dynamic group rule. The process 600 is described with reference to FIGS. 1-5B. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 601, a system may obtain directory data that defines user attributes for multiple users associated with an organizational structure. In various implementations, the directory data defines specific values for the user attributes. For example, on a per-user-basis, the directory data may define values for one or more of a "Department" user attribute, a "Location" user attribute, and so on.

At block 603, the system may receive group rule parameters for a dynamic group rule. In various implementations, the group rule parameters may include one or more rule syntax expressions and one or more logical operations that logically connect the one or more rule syntax expressions. For example, as described in relation to FIG. 3, the group rule parameters may include one or more rule syntax expressions 304 which may be related via one or more logical operators 306.

At block 605, the system may receive a subgroup definition that indicates one or more selected user accounts to perform validation of group rule parameters against. For example, as described in relation to FIG. 4, an administrator that is currently defining the dynamic group rule may individually select user accounts which she either expects will be included within and/or excluded from a full membership list for the dynamic group rule.

At block 607, the system generates a subgroup validation report that indicates whether individual ones of the user accounts selected for inclusion within the subgroup definition satisfy the group rule parameters. For example, if the subgroup definition identifies a first user account and a second user account, then the subgroup validation report may indicate a first outcome corresponding to the first user account and a second outcome corresponding to the second user account. In the event that the first outcome and second outcome are consistent with the administrator's intentions, then the subgroup validation report may serve as confirmation as to the efficacy of the group rule parameters. In contrast, if the first outcome and/or second outcome deviate from the administrator's intentions, then the subgroup validation report may serve as an indication that the group rule parameters have a rule syntax error that should be addressed prior to deploying the corresponding dynamic group rule.

At block 609, the system receives a group rule deployment instruction.

At block 611, the system may generate a full membership list by analyzing the group rule parameters against the organization's entire user directory in response to receiving this group rule deployment instruction.

Figure 7:
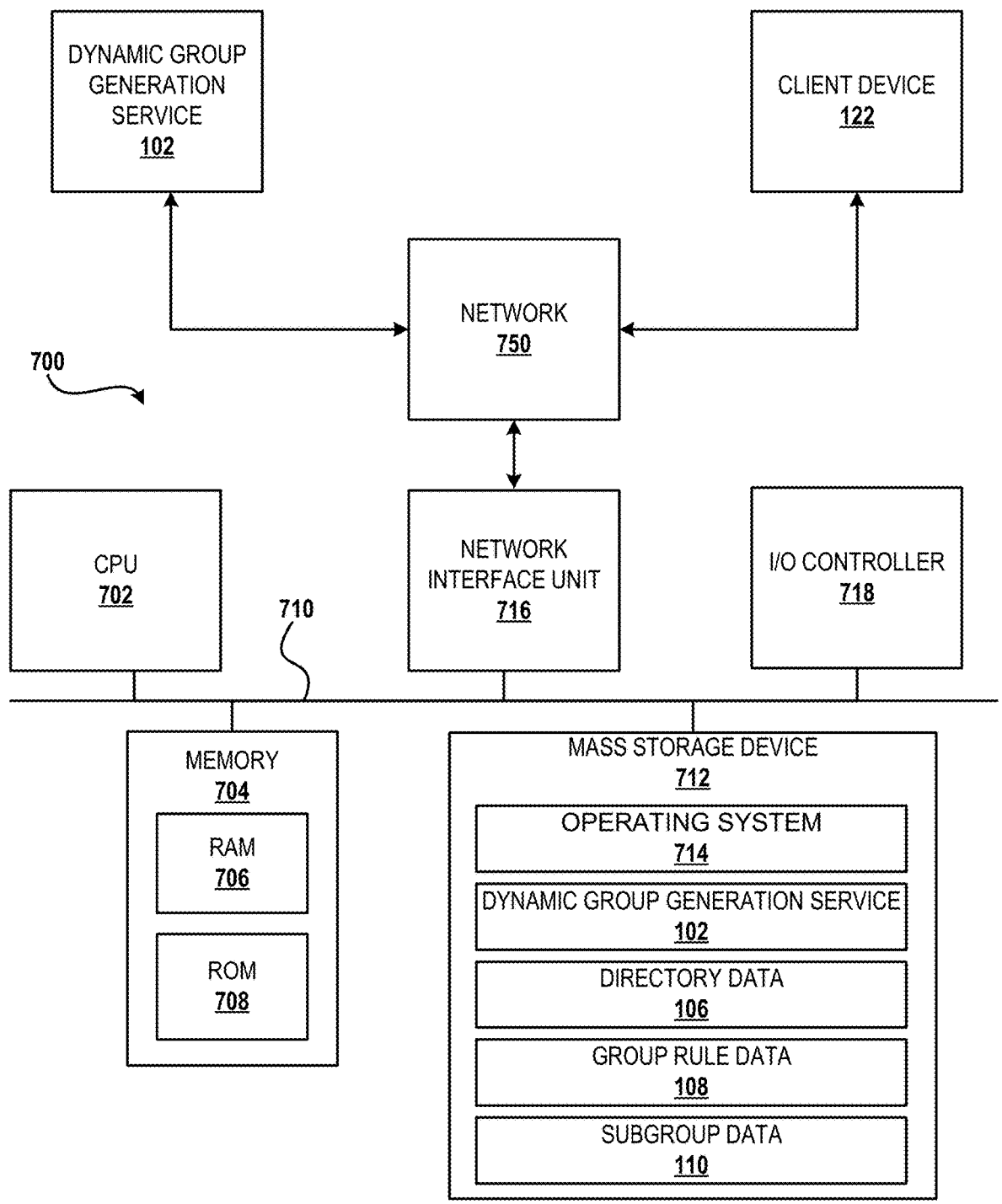
FIG. 7 shows additional details of an example computer architecture for a computer capable of executing the query scoping service and/or any program components thereof as described herein.

FIG. 7 shows additional details of an example computer architecture 700 for a computer capable of executing the query scoping service 102 and/or any program components thereof as described herein. Thus, the computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. The mass storage device 712 may further include one or more of the query scoping service 102, the directory data 106, and/or the group rule data 108, and/or subgroup data 110.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 650 and/or another network (not shown). The computer architecture 700 may connect to the network 650 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 650 through a network interface unit 716, the computing architecture may enable the Dynamic Group Generation Service 102 to communicate with the client device 122.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

The techniques disclosed and claimed herein are believed to be applicable to a variety of systems and approaches involving utilizing subgroup definitions for validating group rule parameters associated with populating a full membership list of user accounts and/or computing devices (e.g., client devices assigned to employees of an organization). Aspects of the techniques are described predominantly in the context of a subgroup definition of manually selected user accounts being utilized to generate a subgroup validation report indicating whether particular users of an organization are going to be included within a full membership list if certain group rule parameters are deployed. While the present invention is not necessarily limited to such implementations, an appreciation of various aspects of the invention are best and/or readily gained through descriptions of such implementations. However, utilizing subgroup definitions of selected computing devices to validate the efficacy of group rule parameters for populating a membership list of computing devices shall be considered variations of such implementations.

Accordingly, generic references to attributes within the foregoing description and in the appended claims may refer to user attributes, or device attributes, or both. Furthermore, generic references to accounts within the foregoing description and in the appended claims may refer to user accounts, device accounts, or both. Furthermore, generic references to a directory within the foregoing description and in the appended claims may refer to a user directory, a device directory, or both.

The disclosure presented herein may be considered in view of the following clauses.

EXAMPLE CLAUSES

The disclosure presented herein may be considered in view of the following clauses.

Example 1

A system for validating a dynamic group rule, comprising: at least one processor; and memory in communication with the at least one processor, the memory having computer-readable instructions stored thereupon that, when executed by the at least one processor, cause the system: obtain directory data that defines attribute values, in association with user attributes, for a plurality of user accounts; receive, from a computing device, group rule parameters of the dynamic group rule, wherein the group rule parameters define one or more values of interest for one or more individual ones of the user attributes; receive, from the computing device, a subgroup definition that indicates at least one selected user account of the plurality of user accounts; generate, based on the group rule parameters and the subgroup definition, a subgroup validation report that causes the computing device to indicate whether individual user accounts, of the at least one selected user account, satisfy the group rule parameters for inclusion in a full membership list of the dynamic group rule; receive, from the computing device, a group rule deployment instruction to initiate generation of the full membership list; and generate the full membership list in response to the group rule deployment instruction, wherein the full membership list includes one or more other user accounts, of the plurality of user accounts, that are omitted from the at least one selected user account indicated by the subgroup definition.

Example 2

The system of Example 1, wherein the computer-readable instructions further cause the system to expose a group rule management portal that includes one or more user interface (UI) elements that facilitate generating the subgroup definition by individually selecting the at least one selected user account from the plurality of user accounts.

Example 3

The system of Example 1, wherein the subgroup validation report identifies at least one first user account that satisfies the group rule parameters for inclusion in the full membership list of the dynamic group rule.

Example 4

The system of Example 3, wherein the subgroup validation report further identifies at least one second user account that fails to satisfy the group rule parameters for inclusion in the full membership list of the dynamic group rule.

Example 5

The system of Example 1, wherein the subgroup validation report includes a plurality of single syntax expression validation results in association with an individual user account of the at least one selected user account.

Example 6

The system of Example 5, wherein the computer-readable instructions further cause the system to cause the computing device to render a validation tree that corresponds to the individual user account and that graphically illustrates the plurality of single syntax expression validation in association with a logical operator of the group rule parameters.

Example 7

The system of Example 6, wherein the validation tree is rendered on the computing device in response to a user input selection of a user interface element that is rendered in association with a user result that corresponds to the individual user account.

Example 8

The system of Example 1, wherein generating the subgroup validation report includes selectively parsing the at least one selected user account based on the group rule parameters, and wherein generating the full membership list includes exhaustively parsing the plurality of user accounts.

Example 9

A system, comprising: at least one processor; and memory in communication with the at least one processor, the memory having computer-readable instructions stored thereupon that, when executed by the at least one processor, cause the system: obtain directory data defining attributes for a plurality of accounts associated with an organizational structure; cause a client device to expose a group rule management portal that includes at least: one or more first user interface (UI) elements that facilitate generating group rule parameters for a dynamic group rule, and one or more second user interface (UI) elements that facilitate generating a subgroup definition that includes one or more selected accounts, of the plurality of accounts, and omits on or more other accounts of the plurality of accounts; generate, based on the group rule parameters and the subgroup definition, a subgroup validation report that indicates whether individual selected accounts, of the one or more selected accounts, satisfy the group rule parameters for inclusion in a full membership list of the dynamic group rule; and based on the subgroup validation report, cause the client device to render, via the group rule management portal, a plurality of results that individually correspond to the individual selected accounts.

Example 10

The system of Example 9, wherein the one or more second UI elements facilitate searching a directory to identify the individual selected accounts for inclusion within the subgroup definition.

Example 11

The system of Example 10, wherein the one or more second UI elements include: a particular UI element that is selectable to add the individual selected accounts to the subgroup definition, and another particular UI element that is selectable to remove a particular account from the subgroup definition.

Example 12

The system of Example 9, wherein the computer-readable instructions further cause the system to: cause the client device to render, via the group rule management portal, a validation tree that corresponds to an individual result of the plurality of results, wherein the validation tree includes: a first syntax expression validation result that indicates a first outcome of a first rule syntax expression of the group rule parameters, and a second syntax expression validation result that indicates a second outcome of a second rule syntax expression of the group rule parameters.

Example 13

The system of Example 12, wherein the validation tree further includes a third outcome corresponding to a logical operator that logically connects the first rule syntax expression and the second rule syntax expression.

Example 14

The system of Example 9, wherein the computer-readable instructions further cause the system to: receive, from the client device, a group rule deployment instruction that is generated subsequent to causing the client device to render the plurality of results based on the subgroup validation report; and generate a full membership list in response to the group rule deployment instruction, wherein the full membership list includes one or more other accounts, of the plurality of accounts, that are omitted from the one or more selected account indicated by the subgroup definition.

Example 15

The system of Example 9, wherein the subgroup validation report identifies: at least one first account that satisfies the group rule parameters for inclusion in a full membership list of the dynamic group rule, and at least one second account that fails to satisfy the group rule parameters for inclusion in the full membership list of the dynamic group rule.

Example 16

A computer-implemented method, comprising: obtaining directory data for a plurality of accounts; receive group rule parameters of a dynamic group rule; receive a subgroup definition that indicates selected accounts of the plurality of accounts; and generate a subgroup validation report that indicates whether the selected accounts satisfy the group rule parameters for inclusion in a full membership list of the dynamic group rule; receive a group rule deployment instruction to initiate generation of the full membership list; and generate the full membership list in response to the group rule deployment instruction, wherein the full membership list includes one or more other accounts, of the plurality of accounts, that are omitted from the selected accounts indicated by the subgroup definition.

Example 17

The computer-implemented method of Example 16, wherein the selected accounts include: a first account that is included within the full membership list, and a second account that is not included within the full membership list.

Example 18

The computer-implemented method of Example 16, further comprising: causing a client device to render, via a group rule management portal, a plurality of results, wherein individual ones of the plurality of results correspond to individual ones of the selected accounts.

Example 19

The computer-implemented method of Example 18, further comprising: causing the client device to render, via the group rule management portal, a validation tree that corresponds to an individual result of the plurality of results.

Example 20

The computer-implemented method of Example 16, further comprising: causing a client device to render, via a group rule management portal, one or more elements that facilitate: searching a user directory or a device directory to identify individual ones of the selected accounts, and selecting the individual ones of the selected accounts for inclusion within the subgroup definition.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, as used in the claims, the term "at least one computing device" and the term "one or more computing devices" being used within a single claim is not to be construed as a single element. For example, a system may cause "at least one computing device" to perform some actions and "one or more computing devices" to perform other actions. In some implementations, the "at least one computing device" may share some of all of the individual devices with the "one or more computing devices." For example, the "at least one computing device" wholly or partially overlap with the "one or more computing devices." In some embodiments, no single computing device of the "at least one computing device" is shared with or otherwise common to the "one or more computing devices."

What is claimed is:

1. A system for validating a dynamic group rule, comprising:
   at least one processor; and
   memory in communication with the at least one processor, the memory having computer-readable instructions stored thereupon that, when executed by the at least one processor, cause the system to:
      obtain directory data that defines attribute values, in association with user attributes, for a plurality of user accounts;
      receive, from a computing device, group rule parameters of the dynamic group rule, wherein the group rule parameters define one or more values of interest for one or more individual ones of the user attributes;
      receive, from the computing device, a subgroup definition that indicates at least one selected user account of the plurality of user accounts;
      generate, based on the group rule parameters and the subgroup definition, a subgroup validation report that causes the computing device to indicate whether individual user accounts, of the at least one selected user account, satisfy the group rule parameters for inclusion in a full membership list of the dynamic group rule;
      receive, from the computing device, a group rule deployment instruction to initiate generation of the full membership list; and
      generate the full membership list in response to the group rule deployment instruction, wherein the full membership list includes one or more other user accounts, of the plurality of user accounts, that are omitted from the at least one selected user account indicated by the subgroup definition.

2. The system of claim 1, wherein the computer-readable instructions further cause the system to expose a group rule management portal that includes one or more user interface (UI) elements that facilitate generating the subgroup definition by individually selecting the at least one selected user account from the plurality of user accounts.

3. The system of claim 1, wherein the subgroup validation report identifies at least one first user account that satisfies the group rule parameters for inclusion in the full membership list of the dynamic group rule.

4. The system of claim 3, wherein the subgroup validation report further identifies at least one second user account that fails to satisfy the group rule parameters for inclusion in the full membership list of the dynamic group rule.

5. The system of claim 1, wherein the subgroup validation report includes a plurality of single syntax expression validation results in association with an individual user account of the at least one selected user account.

6. The system of claim 5, wherein the computer-readable instructions further cause the system to cause the computing device to render a validation tree that corresponds to the individual user account and that graphically illustrates the plurality of single syntax expression validation in association with a logical operator of the group rule parameters.

7. The system of claim 6, wherein the validation tree is rendered on the computing device in response to a user input selection of a user interface element that is rendered in association with a user result that corresponds to the individual user account.

8. The system of claim 1, wherein generating the subgroup validation report includes selectively parsing the at least one selected user account based on the group rule parameters, and wherein generating the full membership list includes exhaustively parsing the plurality of user accounts.

9. A system, comprising:
   at least one processor; and
   memory in communication with the at least one processor, the memory having computer-readable instructions stored thereupon that, when executed by the at least one processor, cause the system to:
      obtain directory data defining attributes for a plurality of accounts associated with an organizational structure;
      cause a client device to expose a group rule management portal that includes at least:
         one or more first user interface (UI) elements that facilitate generating group rule parameters for a dynamic group rule, and
         one or more second user interface (UI) elements that facilitate generating a subgroup definition that includes one or more selected accounts, of the plurality of accounts, and omits on or more other accounts of the plurality of accounts;
      generate, based on the group rule parameters and the subgroup definition, a subgroup validation report that indicates whether individual selected accounts, of the one or more selected accounts, satisfy the group rule parameters for inclusion in a full membership list of the dynamic group rule; and
      based on the subgroup validation report, cause the client device to render, via the group rule management portal, a plurality of results that individually correspond to the individual selected accounts.

10. The system of claim 9, wherein the one or more second UI elements facilitate searching a directory to identify the individual selected accounts for inclusion within the subgroup definition.

11. The system of claim 10, wherein the one or more second UI elements include:
   a particular UI element that is selectable to add the individual selected accounts to the subgroup definition, and
   another particular UI element that is selectable to remove a particular account from the subgroup definition.

12. The system of claim 9, wherein the computer-readable instructions further cause the system to:
   cause the client device to render, via the group rule management portal, a validation tree that corresponds to an individual result of the plurality of results, wherein the validation tree includes:
      a first syntax expression validation result that indicates a first outcome of a first rule syntax expression of the group rule parameters, and
      a second syntax expression validation result that indicates a second outcome of a second rule syntax expression of the group rule parameters.

13. The system of claim 12, wherein the validation tree further includes a third outcome corresponding to a logical operator that logically connects the first rule syntax expression and the second rule syntax expression.

14. The system of claim 9, wherein the computer-readable instructions further cause the system to:
   receive, from the client device, a group rule deployment instruction that is generated subsequent to causing the client device to render the plurality of results based on the subgroup validation report; and
   generate a full membership list in response to the group rule deployment instruction, wherein the full membership list includes one or more other accounts, of the plurality of accounts, that are omitted from the one or more selected account indicated by the subgroup definition.

15. The system of claim 9, wherein the subgroup validation report identifies:
   at least one first account that satisfies the group rule parameters for inclusion in a full membership list of the dynamic group rule, and
   at least one second account that fails to satisfy the group rule parameters for inclusion in the full membership list of the dynamic group rule.

16. A computer-implemented method, comprising:
   obtaining directory data for a plurality of accounts;
   receiving group rule parameters of a dynamic group rule;
   receiving a subgroup definition that indicates selected accounts of the plurality of accounts;
   generating a subgroup validation report that indicates whether the selected accounts satisfy the group rule parameters for inclusion in a full membership list of the dynamic group rule;
   receiving a group rule deployment instruction to initiate generation of the full membership list; and
   generating the full membership list in response to the group rule deployment instruction, wherein the full membership list includes one or more other accounts, of the plurality of accounts, that are omitted from the selected accounts indicated by the subgroup definition.

17. The computer-implemented method of claim 16, wherein the selected accounts include:
   a first account that is included within the full membership list, and
   a second account that is not included within the full membership list.

18. The computer-implemented method of claim 16, further comprising:
   causing a client device to render, via a group rule management portal, a plurality of results, wherein individual ones of the plurality of results correspond to individual ones of the selected accounts.

19. The computer-implemented method of claim 18, further comprising:
causing the client device to render, via the group rule management portal, a validation tree that corresponds to an individual result of the plurality of results.

20. The computer-implemented method of claim 16, further comprising:
causing a client device to render, via a group rule management portal, one or more elements that facilitate:
searching a user directory or a device directory to identify individual ones of the selected accounts, and
selecting the individual ones of the selected accounts for inclusion within the subgroup definition.

* * * * *